Feb. 4, 1930. F. GARGIULO Re. 17,579

RADIATOR FOR INTERNAL COMBUSTION ENGINES

Original Filed June 16, 1921 2 Sheets-Sheet 1

Inventor
Frederick Gargiulo
By Henry E. Rockwell
Attorney

Feb. 4, 1930. F. GARGIULO Re. 17,579

RADIATOR FOR INTERNAL COMBUSTION ENGINES

Original Filed June 16, 1921 2 Sheets-Sheet 2

Inventor

Frederick Gargiulo

By Henry E. Rockwell

Attorney

Reissued Feb. 4, 1930

Re. 17,579

UNITED STATES PATENT OFFICE

FREDERICK GARGIULO, OF NAPLES, ITALY, ASSIGNOR TO THE G & O MANUFACTURING COMPANY, OF NEW HAVEN, CONNECTICUT

RADIATOR FOR INTERNAL-COMBUSTION ENGINES

Original No. 1,426,725, dated August 22, 1922, Serial No. 477,900, filed June 16, 1921. Application for reissue filed June 28, 1924. Serial No. 723,056.

My invention relates to an improvement in radiators for the cooling systems of internal combustion engines such as are employed for automobiles, air craft, etc., the object being to produce a structure of superior stiffness and efficiency, having the external appearance, front and back, of a radiator of the so-called cellular type, but internally distinguished therefrom by having vertically intercommunicating air-passages, the walls of which are inclined to commingle the air and deflect it upwardly and downwardly.

With these ends in view, my invention consists in a radiator-unit having cellular air-inlet and air-outlet openings larger than and leading into and out of upwardly and downwardly inclined air-passages vertically intercommunicating throughout the length of the unit.

My invention further consists in a radiator-structure having certain details of construction as will be hereinafter described and pointed out in the claims.

Figure 2:
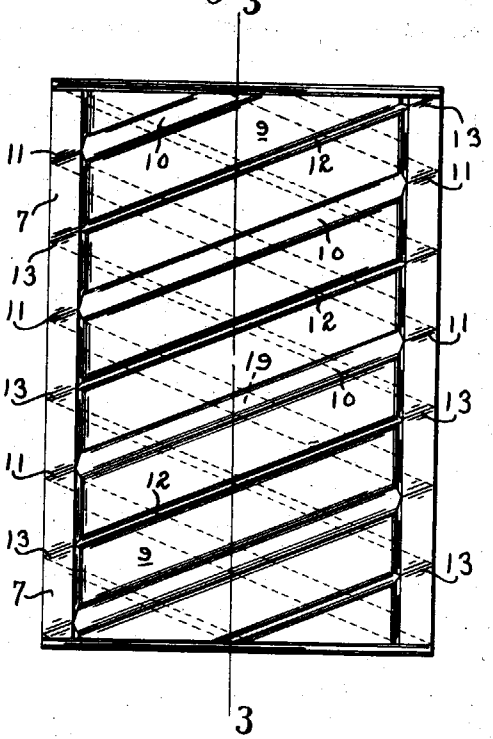
Fig. 2 is an edge view thereof.
Figure 4:
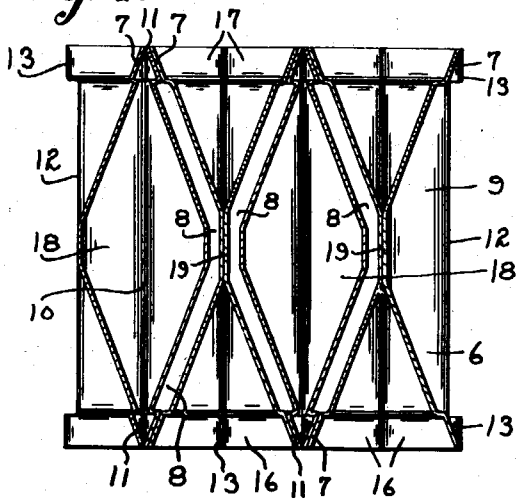
Fig. 4 is a horizontal sectional view thereof on the line 4—4 of Fig. 1.

In carrying out my invention, as herein shown, I employ thin, sheet-metal stock-strips 6 having their edges correspondingly offset to form combined spacing-and-assembling flanges 7, which are offset to half the depth of the ultimate water-channels 8 of the completed structure, as shown in Fig. 4, and which provide means for soldering the strips and the units together. Each stock-strip 6 is also formed with transverse, regularly-spaced, parallel corrugations 9, inclined with respect to the longitudinal axis of the strip and extending through and including the offset combined spacing-and-assembling flanges 7 thereof, as clearly shown in Fig. 2. The apices of the corrugations 9 are flattened as at 10 on the air-passage side of the strip to the plane of the apices 11 of the corrugations of the flanges 7 on the same side of the strip, while the apices of the corrugations 9 on the water channel side of the strip, are flattened as at 12, below the level of the apices 13 of the corrugations of the flanges 7 on the water-channel side of the strip, the flattened apices 10 being wider than the flattened apices 12.

Figure 1:
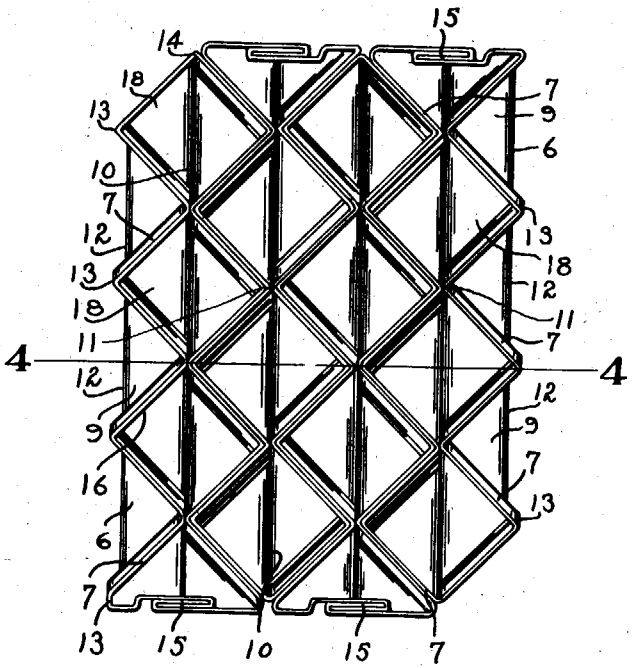
Fig. 1 is a broken view in front elevation of a section of a radiator-structure embodying my invention.
Figure 6:
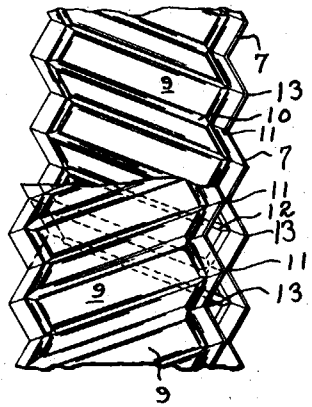
Figure 3:
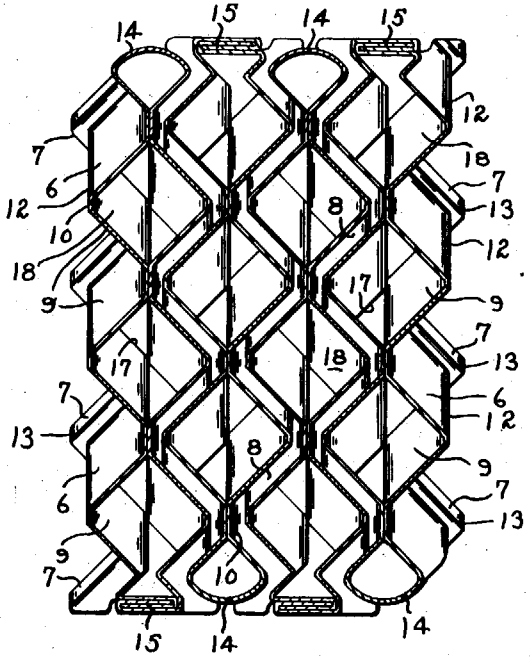
Fig. 3 is a vertical sectional view thereof on the line 3—3 of Fig. 2.
Figure 5:
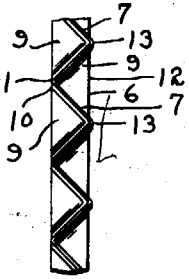
Fig. 5 is a front edge view of a portion of a stock-strip such as I use in the production of my improved radiator-structure; and, Fig. 6 is a fragmentary view of one of the radiator units.

Stock-strips formed as above described are transversely folded midway of their lengths, as at 14 (Fig. 3) and lock-seamed at their opposite ends, as at 15 (Fig. 3), to form the radiator units. By folding each unit-strip as described, cellular air-inlet openings 16 are formed in the front edge of the unit, while corresponding air-outlet openings 17 are formed in the rear edge of the unit, these cellular openings giving the radiator structure of my invention the external front and back appearance of true cellular radiator structures. These openings 16 and 17 lead into and out of air-passages 18 (Fig. 4) having upwardly and downwardly inclined walls and vertically intercommunicating from the top to the bottom of the unit, the said openings being as much larger than the said passages as the flanges are offset from the planes of the stock-strips. The broken air-passages are intermediate between the said openings 16 and 17 which open into and lead out of them. By folding the strip at 14, as described, the opposed apices 11 of the flanges 7 are brought into contact, as shown in Figs. 1 and 3, while, at the same time, the opposed flattened apices 10 of the corrugations of the strip are brought into localized line contact midway the width of the strip, as shown by the diamond-shaped outlines 19, appearing in Figs. 2 and 4, the peculiar diamond-shaped form of the contact 19 proceeding from the crossing of the apices 10 at angles determined by the inclined character of the corrugations of the strip. The radiator units so produced are nested in the usual manner for the production of the water-channels 8, which are continuous from the top to the bottom of the structure, as well as from front to rear, the constriction of these passages being avoided by the slight flattening of the apices 12 of the corrugations on the water-channel side of the strip. In order to nest such units, the alternate units must be formed from strips identical in every other respect but oppositely corrugated.

The radiator structure thus produced is characterized by having the front and back appearance of an ordinary cellular radiator on account of its cellular air-intake openings and cellular air-outlet openings, but internally all of the air passages, with their upwardly and downwardly inclined walls, due to the inclination of the corrugations of the strip, are vertically intercommunicating, so that all the pencils of air entering the cellular air-inlet openings will be broken up and commingled, instead of passing directly from front to rear through the radiator structure, as do the integral air pencils of the cellular radiator structures of the prior art, whereby my improved structure is increased in efficiency, since all portions of the air are brought into contact with the walls of the water-channels, which are continuous from the top to the bottom of the structure, without substantial construction. In other words, the pencils of air entering the cellular air-intake openings 16 completely lose their identity as pencils of air before the air is discharged through the cellular air-outlet openings 17 at the back of the radiator structure.

When, as in prior radiator construction, an unbroken pencil of air is permitted to pass through the radiator, the central part or core of such a pencil does not impinge against the walls of the water passages and cannot, therefore, serve to absorb the heat therefrom, and as a result, the efficiency of the radiator is lowered. In the present instance, however, the air entering one of the air openings 16 is broken up and a part thereof deflected downwardly through one of the inclined corrugations, the other part being deflected upwardly through another of the corrugations. These inclined corrugations cross other corrugations, which are oppositely inclined, and there is to some extent, at the points of crossing, a commingling or interchange of the air which enters at various openings. The air pencils, in this way, are thoroughly broken up and all of the air particles are caused to come into contact with the walls of the water passages so as to absorb the greatest possible amount of heat therefrom.

While I have shown and described a preferred embodiment of my invention, it is to be understood that it is not to be limited to all the details shown but is capable of modification and variation within the spirit of the invention and within the scope of the appended claims.

What I claim is:

1. A sheet metal stock-strip for use in producing radiator structures for internal combustion engines, the said stock-strip having its edges offset to produce combined spacing and assembling flanges, and being transversely corrugated from edge to edge at an inclination to its longitudinal axis through the said flanges, and the apices of the corrugations on the air-passage side of the strip being flattened to permit the apices of the corrugations of the flanges to come into contact with each other when the strip is folded upon itself for the production of the radiator unit.

2. A radiator unit consisting of a corrugated, sheet metal strip folded upon itself and having its ends secured together, the said sheet metal strip having its edges off-set to form combined spacing and assembling flanges, and the strip being transversely corrugated from edge to edge throughout its length at an angle to its longitudinal axis, and the apices of the corrugations on the air passage side of the strip being flattened to permit the apices of the flanges on the said side of the strip to make contact.

3. A radiator structure for internal combustion engines, consisting of a plurality of radiator units, each consisting of a sheet metal strip folded upon itself and having its edges formed with offsetting combined spacing and assembling flanges, and formed throughout its length with transverse corrugations extending from edge to edge and inclined to its longitudinal axis, and the apices of the corrugations on the air passage side of the strip being flattened to permit the apices of the flanges on the same sides of the strip to make contact, the radiator structure thus produced having cellular air-inlet openings and cellular air-outlet openings, and intermediate, vertically intercommunicating, upwardly and downwardly inclined air-passages, and continuous water channels.

4. In a radiator core, a plurality of elongated sheet metal strips each folded upon itself and having transversely inclined corrugations extending substantially from the front to the rear of the core, each folded strip having the corrugations on one face thereon extending in the same direction as and nesting in the corrugations on the neighboring strip on one side and having the corrugations on the other face oppositely inclined with respect to said first face but corresponding to the inclination of, and nesting with the corrugations on the neighboring strip upon the other side, the adjacent faces of neighboring strips having said nesting corrugations forming water channels therebetween and each of said folded strips having on its inner contacting faces oppositely inclined corrugations forming air passages therebetween, whereby the air passing into the front of the radiator core is divided into a plurality of portions which are intermingled before the air discharges from the rear of the core.

5. A radiator core comprising a plurality of units arranged side by side, each unit containing a metal strip folded on itself, each strip having transversely inclined corrugations extending substantially from the front to the rear of the core, said units being placed in juxtaposed relation with the corrugations of adjacent faces of adjacent units extending in the same direction and nesting together, and the folding of said strips bringing the corrugations on the two faces of each unit into opposite inclination with respect to one another, each unit forming water channels in cooperation with the neighboring units on either side and forming air channels between the folded parts which have oppositely inclined corrugations, whereby the air passing into the front of the radiator is divided into a plurality of portions which are intermingled before the air discharges from the core.

6. In a radiator core, a plurality of elongated sheet metal strips having transversely inclined corrugations extending substantially from the front to the rear of the core, each strip having the corrugations thereon extending in the same direction as and nesting in the corrugations on the neighboring strip on one side and oppositely inclined with respect to the inclination of the corrugations on the neighboring strip on the other side, those neighboring strips which have the nesting corrugations forming water channels therebetween and those neighboring strips with oppositely inclined corrugations forming air passages therebetween, whereby the air passing into the front of the radiator core is divided into a plurality of portions which are intermingled before the air discharges from the rear of the core.

7. A radiator core comprising a plurality of units, each unit containing a pair of metal strips arranged side by side, each strip having transversely inclined corrugations extending substantially from front to rear of the core, said units being placed in juxtaposed relation with the corrugations of adjacent strips of adjacent units extending in the same direction and nesting together, and the corrugations on the remote strips of two adjacent units being oppositely inclined with respect to the inclinations of the corrugations on the adjacent strips, the strips having the nesting corrugations forming water channels therebetween and forming air channels with the strips having oppositely inclined corrugations, whereby the air passing into the front of the radiator core is divided into a plurality of portions which are intermingled before the air discharges into the middle of the core.

In witness whereof, I have hereunto set my hand this 10th day of June, 1924.

FREDERICK GARGIULO.